(12) United States Patent
Valls et al.

(10) Patent No.: US 7,922,802 B2
(45) Date of Patent: Apr. 12, 2011

(54) PIT EMULSIONS

(75) Inventors: Ramon Valls, Barcelona (ES); Stephanie Merlet, Corbell-Essonnes (FR)

(73) Assignee: Cognis IP Management GmbH, Duesseldorf (DE)

( * ) Notice: Subject to any disclaimer, the term of this patent is extended or adjusted under 35 U.S.C. 154(b) by 391 days.

(21) Appl. No.: 12/084,521

(22) PCT Filed: Oct. 25, 2006

(86) PCT No.: PCT/EP2006/010257
§ 371 (c)(1),
(2), (4) Date: May 2, 2008

(87) PCT Pub. No.: WO2007/051549
PCT Pub. Date: May 10, 2007

(65) Prior Publication Data
US 2010/0170416 A1    Jul. 8, 2010

(30) Foreign Application Priority Data

Nov. 3, 2005  (EP) ..................... 05023930

(51) Int. Cl.
*C08L 95/00* (2006.01)
(52) U.S. Cl. .................................. 106/277
(58) Field of Classification Search ........... 106/277
See application file for complete search history.

(56) References Cited

U.S. PATENT DOCUMENTS

| 3,432,320 | A | * | 3/1969 | Pitchford | 106/277 |
| 3,615,798 | A | * | 10/1971 | Woodruff | 523/122 |
| 3,859,227 | A | * | 1/1975 | Dwyer | 106/277 |
| 5,156,652 | A | | 10/1992 | Gregoli et al. | |
| 6,221,370 | B1 | | 4/2001 | Wadle et al. | |
| 6,451,885 | B1 | | 9/2002 | Dresin et al. | |

FOREIGN PATENT DOCUMENTS

| EP | 1 057 873 A1 | 12/2000 |
| EP | 1 111 009 A2 | 6/2001 |
| EP | 1 111 010 A2 | 6/2001 |
| EP | 1 179 570 A2 | 2/2002 |
| EP | 1 189 990 B1 | 2/2003 |
| JP | 1-208606 A | 8/1989 |
| JP | 05156652 | 6/1993 |
| WO | WO 93/11865 A1 | 6/1993 |
| WO | WO 98/09721 A2 | 3/1998 |
| WO | WO 00/14161 A1 | 3/2000 |
| WO | WO 01/00734 A1 | 1/2001 |

\* cited by examiner

*Primary Examiner* — Helene Klemanski

(57) ABSTRACT

A PIT emulsion, including asphalt or bitumen; one or more non-ionic emulsifiers; optionally one or more cationic co-emulsifiers, and/or one or more solvents is provided. A PIT emulsion, including 10% to 70% b.w. asphalt or bitumen; 5% to 15% b.w. of one or more non-ionic emulsifiers; 0 to 5% b.w. of one or more cationic co-emulsifiers; and 0 to 40% b.w. of one or more solvents, where the quantities shown add up to 100% b.w. with water, and optionally other auxiliaries and additives is also provided. A method for making a finely-divided asphalt or bitumen PIT emulsion, including subjecting an aqueous mixture of asphalt or bitumen, at least one non-ionic emulsifier, and optionally a solvent to vigorous stirring to obtain a homogenous composition; heating the homogenous composition above the phase inversion temperature to obtain a PIT emulsion, and cooling the PIT emulsion is also provided.

18 Claims, No Drawings

PIT EMULSIONS

CROSS-REFERENCE TO RELATED APPLICATIONS

This application is a national phase filing under 35 U.S.C. §371 and claims priority to International Application No. PCT/EP2006/010257 which has an International filing date of Oct. 25, 2006, which designated the United States of America and which claims priority to European Application No. 05023930, which was filed on Nov. 3, 2005, the entire disclosures of which are hereby incorporated herein by reference.

BACKGROUND OF THE INVENTION

1. Field of the Invention

The present invention generally relates to bitumen emulsions, and more particularly, to special finely divided emulsions of the Phase-Inversion-Temperature (PIT) type containing asphalt and selected emulsifiers, and a method for obtaining said emulsions and the use of special emulsifiers for preparing them.

2. Background Information

Asphalt or bitumen emulsions are well-known materials, which are useful for road-making and for other purposes. Their advantages are ease of handling, because of their lower viscosities than the starting bitumen, and their ability to be applied at lower temperatures in spraying applications and other techniques. There are no environmental problems because in use, the emulsion breaks and the water present evaporates to leave a film of asphalt or bitumen where required. Examples of documents illustrating the state of the art are, e.g., EP 1189990 B1, EP 1179570 A2 or EP 1111010 A1.

There are different methods currently used in the preparation of asphalt or bitumen emulsions using mechanical devices, for example, colloid mills or centrifugal pumps. In conventional methods, the particle size of the final emulsions is typically about 4 to 10 µm. These, procedures, however, are both time and energy consuming, and lead to products which have a limited storage time, since the emulsions thus obtained show a strong tendency to form sediments within a couple of days, especially under temperature stress.

SUMMARY OF THE INVENTION

Briefly described, according to an aspect of the invention, a phase-inversion-temperature (PIT) emulsion includes: (a) asphalt or bitumen; (b) one or more non-ionic emulsifiers; (c) optionally one or more cationic co-emulsifiers, and/or (d) one or more solvents.

According to another aspect of the invention, a phase-inversion-temperature (PIT) emulsion includes: (a) 10% to 70% b.w. asphalt or bitumen; (b) 5% to 15% b.w. of one or more non-ionic emulsifiers; (c) 0 to 5% b.w. of one or more cationic co-emulsifiers; and (d) 0 to 40% b.w. of one or more solvents, where the quantities shown add up to 100% b.w. with water, and optionally other auxiliaries and additives.

According to another aspect of the invention, a method for making a finely-divided asphalt or bitumen phase-inversion-temperature (PIT) emulsion includes (a) subjecting an aqueous mixture of asphalt or bitumen, at least one non-ionic emulsifier, and optionally a solvent to vigorous stirring to obtain a homogenous composition; (b) heating the homogenous composition above the phase inversion temperature to obtain a PIT emulsion, and (c) cooling the PIT emulsion.

DETAILED DESCRIPTION OF THE INVENTION

Therefore, the problem underlying the present invention has been to develop a new method of preparing asphalt or bitumen emulsions, which avoids the use of high shear equipment and provides emulsions with improved stability, and at least comparable properties in road applications. Particularly, these emulsions should show a (D50) droplet size of less than 1 µm and a (D90) droplet size of less than 0.5 µm.

The present invention claims PIT Emulsions, comprising
(a) asphalt or bitumen,
(b) non-ionic emulsifiers, and optionally
(c) cationic co-emulsifiers and/or
(d) solvents.

More particularly, the PIT emulsions according to the present invention show a droplet size (D50) from 0.01 to 1, preferably from 0.1 to 0.4 µm and a droplet size (D90) from 0.1 to 0.5, preferably from 0.2 to 0.4 µm.

Surprisingly, it has been found that emulsions prepared according to the Phase-inversion-temperature (PIT) method excellently satisfy the complex requirement profile. Especially the incorporation of non-ionic emulsifiers and, more particularly, of fatty alcohol ethoxylates and/or fatty acid glycerides leads to PIT emulsions having a significantly lower average droplet size and showing improved storage stability compared to other products which can be found at the market.

Asphalt and Bitumen

In the following, the terms asphalt and bitumen are employed to describe natural or petroleum-derived bitumens and include the well-known penetration grade bitumens, blown or oxidized grades and polymer-modified bitumens, for example, modified with styrene-butadiene polymers or ethylene vinyl acetate polymers. Examples are those having a softening point (Ring and Ball) from 20° C., preferably from 50° C. to 200° C. Particularly suitable are those whose softening point is between 35° C. and 100° C., especially from 35° C. to 65° C., and more particularly, between 40° C. and 60° C.; and/or those whose ASTM penetration index at 25° C. is from about 40 to about 70.

Non-Ionic Emulsifiers

Suitable emulsifiers which form component (b) are, for example, non-ionic surfactants selected from at least one of the following groups:

products of the addition of 2 to 30 moles of ethylene oxide and/or 0 to 5 moles of propylene oxide onto linear fatty alcohols containing 8 to 22 carbon atoms, onto fatty acids containing 12 to 22 carbon atoms, and onto alkyl phenols containing 8 to 15 carbon atoms in the alkyl group;

$C_{12/18}$ fatty acid monoesters and diesters of products of the addition of 1 to 30 moles of ethylene oxide onto glycerol;

glycerol monoesters and diesters, and sorbitan monoesters and diesters of saturated and unsaturated fatty acids containing 6 to 22 carbon atoms and ethylene oxide adducts thereof;

alkyl mono- and oligoglycosides containing 8 to 22 carbon atoms in the alkyl group and ethoxylated analogues thereof;

products of the addition of 15 to 60 moles of ethylene oxide onto castor oil and/or hydrogenated castor oil;

polyol esters and, in particular, polyglycerol esters such as, for example, polyglycerol polyricinoleate or polyglycerol poly-12-hydroxystearate. Mixtures of compounds from several of these classes are also suitable;

products of the addition of 2 to 15 moles of ethylene oxide onto castor oil and/or hydrogenated castor oil;

partial esters based on linear, branched, unsaturated or saturated $C_{6-22}$ fatty acids, ricinoleic acid and 12-hydroxystearic acid and glycerol, polyglycerol, pentaerythritol, dipentaerythritol, sugar alcohols (for example sorbitol), alkyl glucosides (for example methyl glucoside, butyl glucoside, lauryl glucoside) and polyglucosides (for example cellulose);

trialkyl phosphates and mono-, di- and/or tri-PEG-alkyl phosphates;

wool wax alcohols;

polysiloxane/polyalkyl polyether copolymers and corresponding derivatives;

mixed esters of pentaerythritol, fatty acids, citric acid and fatty alcohol and/or mixed esters of fatty acids containing 6 to 22 carbon atoms, methyl glucose and polyols, preferably glycerol;

polyalkylene glycols; and glycerol carbonate.

A preferred embodiment of the invention is characterized by the use of mixtures of at least two non-ionic emulsifiers, more particularly, (b1) fatty alcohol alkoxylates, preferably fatty alcohol ethoxylates, and (b2) fatty acid (partial) glycerides.

The fatty alcohol alkoxylates, and more particularly the fatty alcohol ethoxylates (component b1) preferably correspond to formula (I):

$$R^1O(CH_2CH_2O)_nH \quad (I)$$

in which $R^1$ is a linear or branched alkyl and/or alkenyl group containing 12 to 24, and more particularly, 16 to 22 carbon atoms, and n is a number from 1 to 30, and more particularly from 10 to 20. Typical examples are products of the addition of on average 10 to 20 moles of ethylene oxide onto cetyl alcohol, stearyl alcohol, isostearyl alcohol, cetearyl alcohol and behenyl alcohol.

The fatty acid partial glycerides, i.e., monoglycerides, diglycerides and technical mixtures thereof, which may still contain small quantities of triglycerides from their production and which form component (b2), generally correspond to formula (II):

$$\begin{array}{l} CH_2O(CH_2CH_2O)_mCOR^2 \\ | \\ CHO(CH_2CH_2O)_pR^3 \\ | \\ CH_2O(CH_2CH_2O)_qR^4 \end{array} \quad (II)$$

in which $R^2CO$ is a linear or branched, saturated and/or unsaturated acyl group containing 6 to 22 and, preferably, 12 to 18 carbon atoms, $R^3$ and $R^4$ independently of one another have the same meaning as $R^2CO$ or represent OH, and the sum (m+p+q) is 0 or a number between 1 to 100 and, preferably, 5 to 25, with the proviso that at least one of the two substituents $R^3$ and $R^4$ represents OH. Typical examples are mono- and/or diglycerides based on caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. Technical lauric acid glycerides, palmitic acid glycerides, stearic acid glycerides, isostearic acid glycerides, oleic acid glycerides, behenic acid glycerides and/or erucic acid glycerides, which have a monoglyceride content of 50 to 95% by weight and, preferably, 60 to 90% by weight are preferably used. The ratio in which the fatty alcohol alkoxylates, particularly the fatty alcohol ethoxylates, and fatty acid (partial) glycerides, are used is non-critical within wide limits and may be from 90:10 to 10:90, preferably from 75:25 to 25:75, and more preferably from 60:40 to 40:60 parts by weight.

Cationic Co-Emulsifiers

To modify the cationic character of emulsion, an additional cationic emulsifier may be added. The final emulsion will be cationic and will increase the speed of breaking the emulsion when aggregates are added in the road application. Cationic emulsifiers of the amido amine type are preferred. Suitable amido amine derivatives are disclosed, e.g., in EP 1189990 A1, EP 1179570 A1, EP 1111010 A1, EP 1111009 A1 and WO 0100734 A1, which are hereby incorporated in their entireties by reference herein.

Solvents

It is advisable to use non-polar solvents to obtain a better emulsion, with lower viscosity and better stability. This optional component (d) may be selected, for example, from mineral oils, hydrocarbons, fatty acid lower alkyl esters such as, for example, the lower alkyl ($C_1$-$C_4$) esters, i.e., methyl, ethyl, propyl and/or butyl esters, of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. Vegetable triglycerides, for example coconut oil, palm oil, palm kernel oil, sunflower oil, olive oil and the like are also suitable.

PIT Emulsions

The PIT emulsions according to the present invention may comprise 30% to 90%, and preferably 40% to 60% water. In a preferred embodiment, the composition comprises:

(a) 10% to 70%, preferably 20% to 40% b.w. asphalt or bitumen, (b) 5% to 15%, preferably 8% to 12% b.w. non-ionic emulsifiers, (c) 0 to 5%, preferably 1% to 4% b.w. cationic co-emulsifiers, and (d) 0 to 40%, preferably 5% to 30% b.w. solvents, under the condition that the quantities shown add up to 100% b.w. with water, and optionally contain other typical auxiliaries and additives.

Another object of the present invention is directed to a method for making a finely divided asphalt or bitumen emulsion of the PIT type, which is characterized in that:

(a) an aqueous mixture of asphalt or bitumen, at least one non-ionic emulsifier, and optionally a solvent are subjected to vigorous stirring in order to obtain a homogeneous composition, (b) the mixture thus obtained is heated up above the phase inversion temperature in order to achieve a PIT emulsion, and finally (c) the emulsion thus obtained is cooled down and optionally further diluted with water or an aqueous solution of a cationic co-emulsifier.

Industrial Application

Finally, another object of the present invention is directed to the use of non-ionic emulsifiers, particularly of fatty alcohol alkoxylates and/or fatty acid glycerides, for preparing finely divided asphalt or bitumen emulsions of the PIT type, which are preferably used in amounts from 5% to 15% b.w. calculated on the total emulsion.

EXAMPLES

Examples 1 to 3, Comparative Examples C1 and C2

Bitumen emulsions 1, 2, and 3 for road application were prepared according to the invention by the PIT method, while comparison emulsions C1 and C2 were prepared by the conventional colloid mill method. The emulsions were then tested according to standard tests used in bitumen emulsions for road application. Examples C1 and C2 were made with a conventional emulsifier obtained by procedure described in EP 1179570.

The procedure for making PIT emulsions consists of mixing asphalt and solvent in order to obtain a homogeneous mixture. Non-ionic emulsifiers and half part of water are then added, stirred together and heated up over the phase inversion is temperature (about 95° C.). The emulsion is then cooled down while the remaining part of cold water is added, which optionally comprises the cationic co-emulsifier. The final emulsion is cooled down to room temperature. Table 1 shows the composition of the tested emulsions. All amounts are calculated as weight percent.

TABLE 1

Composition of the emulsions

| Formulation | 1 | 2 | 3 | C1 | C2 |
|---|---|---|---|---|---|
| Asphalt | 14 | 20 | 14 | 63 | 63 |
| Solvent | 21 | 15 | 21 | 2 | 2 |
| $C_{12/18}$ Fatty alcohol + 5EO | 9.3 | 9.3 | 9.3 | — | — |
| Oleic acid monoglyceride | 2.3 | 2.3 | 2.3 | — | — |
| $C_{12/18}$ Fatty acid dimethylaminopropyl amide | | | 1.0 | 0.25 | 0.75 |
| Water | | | add to 100 | | |

The droplet size for 50% and, respectively, 90% of the droplets in the emulsion, and the stability and Brookfield viscosity (RVT, 20° C., Spindle 1, 10 Upm) of the emulsions thus obtained are shown in Table 2. With respect to stability, the abbreviations have the following meanings: (+++) no sedimentation, (++) sedimentation <1%, (+) sedimentation <3%, (−) sedimentation <5%, (−−) sedimentation >5%.

TABLE 2

Droplet size, stability, and viscosity of the emulsions

| Formulation | 1 | 2 | 3 | C1 | C2 |
|---|---|---|---|---|---|
| Droplet size D(50) [microns] | 0.147 | 0.298 | 0.300 | 4.5 | 1.2 |
| Droplet size D(90) [microns] | 0.319 | 0.408 | 0.440 | 6 | 4.3 |
| Stability | | | | | |
| after 1 week | +++ | +++ | +++ | ++ | ++ |
| after 4 weeks | +++ | +++ | +++ | + | − |
| at 1% b.w. water dilution | +++ | +++ | +++ | −− | −− |
| Viscosity [mPas] | 300 | 350 | 420 | | |

Table 3 reflects the application properties according to standard NLT (Normas del Laboratorio de Transporte) test methods for bitumen emulsions.

TABLE 3

Properties in road application

| Formulation | 1 | 2 | 3 | C1 | C2 |
|---|---|---|---|---|---|
| Penetration | excellent | excellent | excellent | no penetration | no penetration |
| Emulsion pH | 6 | 6 | 2 | 1.9 | 1.8 |
| Sieving (NLT-142) | <0.1 | <0.1 | <0.1 | <0.1 | <0.1 |
| Breaking index | 120 | 140 | 100 | 40 | 97 |
| Adhesion (NLT-166) | excellent | excellent | excellent | excellent | excellent |
| Sedimentation (NLT-140) | 0% | 0% | 0% | 4% | 2.3% |

What is claimed is:

1. A phase-inversion-temperature (PIT) emulsion, comprising:
    (a) asphalt or bitumen;
    (b) one or more non-ionic emulsifiers, selected from the group consisting of fatty alcohol alkoxylates, fatty acid partial glycerides, and mixtures thereof;
    (c) optionally, one or more cationic co-emulsifiers, and/or
    (d) optionally, one or more solvents,
wherein said emulsion is applied to a road or roadbed, and wherein said emulsion is formed by a phase inversion temperature (PIT) process comprising the steps of:
    (i) subjecting an aqueous mixture of the asphalt or bitumen component (a), the non-ionic emulsifier component (b), optionally, the cationic co-emulsifier component (c), and optionally, the solvent component (d), to vigorous stirring to form a homogenous composition;
    (ii) heating said homogenous composition above the phase inversion temperature to obtain a PIT emulsion, and
    (iii) cooling said PIT emulsion,
wherein said phase inversion temperature is about 95° C.

2. The PIT emulsion according to claim 1, wherein the emulsion has a droplet size (D50) from 0.1 to 0.4 μm.

3. The PIT emulsion according to claim 1, wherein the emulsion has a droplet size (D90) from 0.2 to 0.4 μm.

4. The PIT emulsion according to claim 1, wherein cationic co-emulsifiers comprise amido amine derivatives.

5. The PIT emulsion according to claim 1, wherein the one or more solvents are selected from the group consisting of mineral oils, hydrocarbons, fatty acid lower alkyl esters, and vegetable triglycerides.

6. The PIT emulsion according to claim 1, further comprising 30% to 90% water.

7. The phase-inversion-temperature (PIT) emulsion of claim 1, comprising:
    (a) 10% to 70% by weight, based on the emulsion, of asphalt or bitumen;
    (b) 5% to 15% by weight, based on the emulsion, of one or more non-ionic emulsifiers, selected from the group consisting of fatty alcohol alkoxylates, fatty acid partial glycerides, and mixtures thereof;
    (c) 0 to 5% by weight, based on the emulsion, of one or more cationic co-emulsifiers; and
    (d) 0 to 40% by weight, based on the emulsion, of one or more solvents,
wherein the quantities add up to 100% with water, and optionally other auxiliaries and additives.

8. The PIT emulsion according to claim 7, wherein the emulsion has a droplet size (D50) from 0.1 to 0.4 μm.

9. The PIT emulsion according to claim 7, wherein the emulsion has a droplet size (D90) from 0.2 to 0.4 μm.

10. The PIT emulsion according to claim 7, wherein the cationic co-emulsifiers comprise amido amine derivatives.

11. The PIT emulsion according to claim 7, wherein the one or more solvents are selected from the group consisting of mineral oils, hydrocarbons, fatty acid lower alkyl esters, and vegetable triglycerides.

12. The PIT emulsion according to claim 7, further comprising 30% to 90% water.

13. A method for making a finely-divided asphalt or bitumen phase-inversion-temperature (PIT) emulsion, comprising the steps of:
- (a) subjecting an aqueous mixture of asphalt or bitumen, at least one non-ionic emulsifier, and optionally a solvent, to vigorous stirring to obtain a homogenous composition;
- (b) heating the homogenous composition above the phase inversion temperature to obtain a PIT emulsion, and
- (c) cooling the PIT emulsion, wherein said phase inversion temperature is about 95° C.

14. The method according to claim 13, further comprising diluting the PIT emulsion with water or an aqueous solution of a cationic co-emulsifier.

15. The PIT emulsion of claim 1, wherein said one or more nonionic emulsifiers comprises a mixture of fatty alcohol alkoxylates and fatty acid partial glycerides.

16. The PIT emulsion of claim 7, wherein said one or more nonionic emulsifiers comprises a mixture of fatty alcohol alkoxylates and fatty acid partial glycerides.

17. The PIT emulsion of claim 7, wherein said one or more solvents (d) is present in 2 to 21% by weight based on the emulsion.

18. A phase-inversion-temperature (PIT) emulsion, consisting of:
- (a) 10% to 70% by weight, based on the emulsion, of asphalt or bitumen;
- (b) 5% to 15% by weight, based on the emulsion, of one or more non-ionic emulsifiers, selected from the group consisting of fatty alcohol alkoxylates, fatty acid partial glycerides, and mixtures thereof;
- (c) 0 to 5% by weight, based on the emulsion, of one or more cationic co-emulsifiers;
- (d) 0 to 40% by weight, based on the emulsion, of one or more solvents; and
- (e) water;

wherein said emulsion is applied to a road or roadbed, and wherein said emulsion is formed by a phase inversion temperature (PIT) process comprising the steps of:
- (i) subjecting a mixture of the asphalt or bitumen component (a), the non-ionic emulsifier component (b), optionally, the cationic co-emulsifier component (c), optionally, the solvent component (d), and water (e), to vigorous stirring to form a homogenous composition;
- (ii) heating said homogenous composition above the phase inversion temperature to obtain a PIT emulsion, and
- (iii) cooling said PIT emulsion, wherein said phase inversion temperature is about 95° C.

* * * * *